June 10, 1969  J. COUGET  3,448,480
WINDOW WIPER FOR MOTOR VEHICLES
Filed Nov. 22, 1966
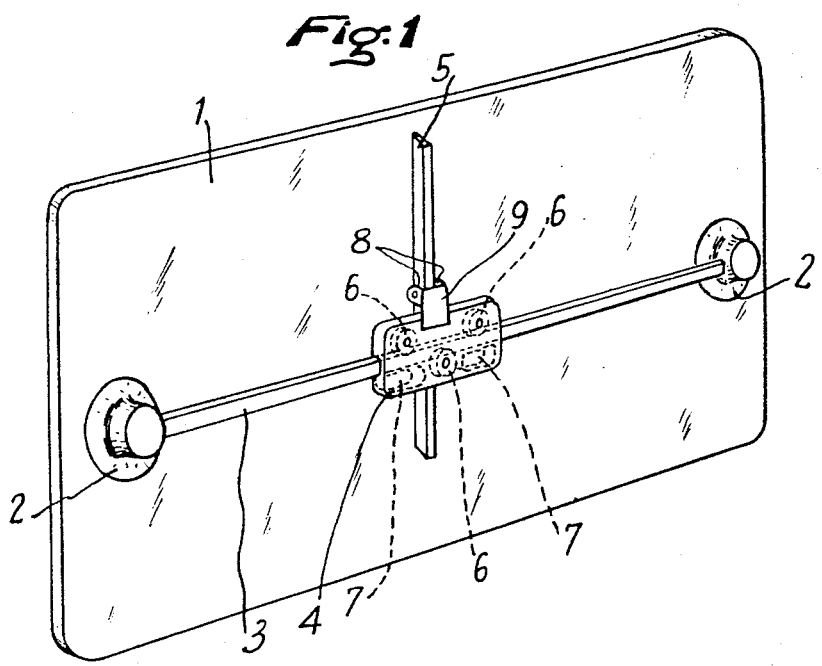
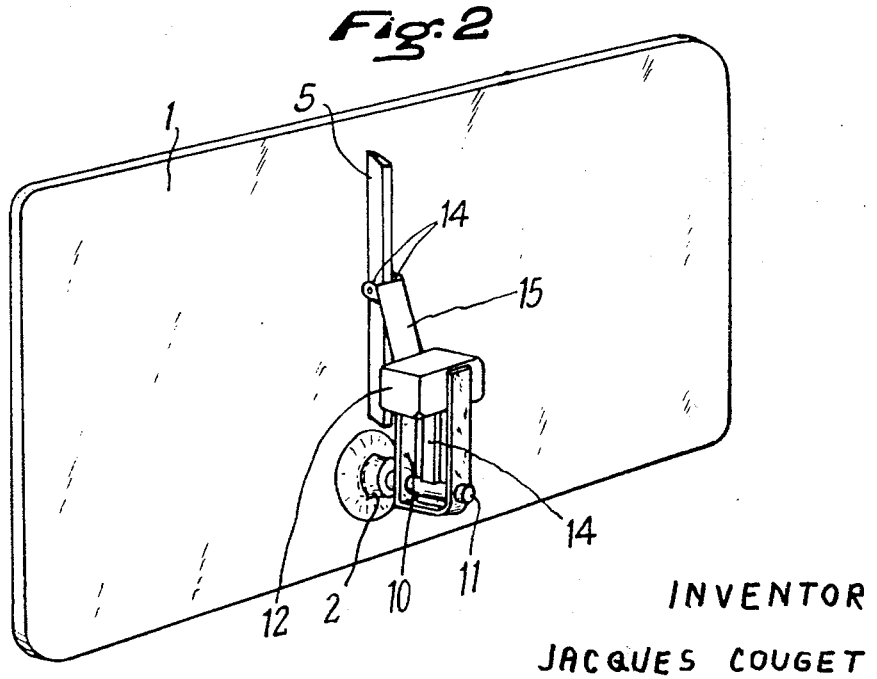
INVENTOR
JACQUES COUGET
By *McGlew and Toren*
ATTORNEYS United States Patent Office 3,448,480
Patented June 10, 1969

3,448,480
WINDOW WIPER FOR MOTOR VEHICLES
Jacques Couget, 23 Rue Pic-Paris, Tours,
Indre-et-Loire, France
Filed Nov. 22, 1966, Ser. No. 596,223
Claims priority, application France, Nov. 25, 1965,
1,468
Int. Cl. B60s 1/06
U.S. Cl. 15—250                                                   8 Claims

ABSTRACT OF THE DISCLOSURE

A window wiper for mounting on a window in a vehicle is comprised of means for attaching a support device to the window. A bracket is attached to and is arranged to be movable relative to the support device. Mounted on the bracket is a gravity block which is arranged to be subjected to the forces produced by the motion of the vehicle whereby the bracket moves on the support device. A wiper blade is attached to the bracket and in reaction to the motion of the vehicle, the gravity block causes the bracket to move back and forth on the support device and, in turn, the wiper blade is arranged in moving contact with the window of the vehicle causing a wiping action as it travels in either a rectilinear or curvilinear path due to the manner in which the bracket is affixed to the support device.

Summary of the invention

The transparency of glass window panels with which all motor vehicles and especially automobiles are equipped is sometimes impaired by outside agents such as rain, dust or mud which are deposited on the outer surfaces of vehicles or by mist which forms on the inner surfaces of windows.

The front window panel or windshield is always provided with an external cleaning device or windshield wiper and frequently also with an interior demisting system. In most instances, the other window panels and particularly the rear window are not equipped with any of these devices either on the inside or on the outside.

If external wipers of conventional design including wiper motor and driving link-rods as well as interior demisting systems were fitted as standard equipment on the rear windows of automobiles, this would result in an increase in the sale price of new vehicles thus equipped. And in the case of vehicles already in use for which no provision has been made by the manufacturers for either window wipers or demisting systems, the installation of such equipment would entail prohibitive cost.

Moreover, by virtue of their position, windows which are located at the sides and rear of a motor vehicle are less exposed to the soiling action of outside agents than the windshield, and this particularly true of the rear window. In the case of these windows, it is consequently not essential to adopt the same wiper systems as those which are at present fitted on windshields and which are efficient but costly. However, good general visibility is a highly important safety factor, and the continual increase in the number of vehicles on the roads constantly increases the need for such good visibility.

The object of the present invention is to provide an automobile window wiper in which the displacement of the wiper blade is initiated by a moving weight, or so-called movable gravity block. The window wiper according to the invention is intended for use both inside and outside of all motor vehicles, does not require any power generating system such as an electric supply or vacuum source, does not comprise any motor and therefore does not have either wiring, piping, dry cells, driving link-rods and the like, and is in addition both simple in design and inexpensive to produce. During the motion of a vehicle which is fitted wtih the novel window wiper, a certain number of forces are exerted on the wiper and produce action on a movable gravity block which forms part of the wiper, viz:

(1) Force of inertia—Developed at the time of changes of direction, accelerations or decelerations of the vehicle and at the time of vertical movement resulting from irregularities in road surfaces.

(2) Weight (a) Developed conjointly with inertial force, as a result of transverse inclination of the vehicle (rolling motion) at the time of changes in direction, or longitudinal inclination (pitching motion) at the time of accelerations or decelerations.

(b) Developed alone when the vehicle is traveling in a straight line, as a result of transverse or longitudinal inclinations (rolling or pitching) of the vehicle caused by the profiles of road surfaces.

The window wiper is fixed on the vehicle on which it is to be used by any suitable means such as screwed supports, clips inserted beneath rubber window seals, suction cups, and so forth.

Among the forces which have been mentioned earlier and which are exerted on a movable weight or gravity block while a motor vehicle is traveling, a certain number of such forces are more especially utilized in the following examples which are given without implied limitation. If the forces applied were complementary to those mentioned or were even to replace these latter in the examples given, the devices which permit the utilization of these forces would not thereby be excluded from the field of application of this invention. Similarly, the component parts of the examples described can be replaced either wholly or in part by equivalent components, and the window wipers which may thus be modified would in no way constitute a departure from the scope of the invention.

In a first example which is shown in FIG. 1, two suction-cup supports 2 are applied against a glass panel or window 1, the effective transparency of which it is desired to maintain. The function of said suction-cups is to hold a guide-rail 3 in the horizontal position and at a constant distance from the surface of the window 1.

A gravity carriage 4 is capable of moving freely along said rail 3 and supports a window-wiper blade 5 in such a manner as to maintain this latter applied against the window 1.

Said gravity carriage 4 is adapted to move along the rail 3 by means of runner-wheels 6 which can be replaced by any other suitable means such as slides, ball-bearings, ball circulation systems and the like. The carriage 4 which constitutes the movable gravity block can consequently be of relatively heavy construction and provided with additional weights 7 for increasing the overall weight, which has a favorable effect in initiating and maintaining the motion of the block.

During the motion of the motor vehicle on which the window wiper herein described is mounted, the gravity carriage 4 which is subjected to a number of the forces previously referred to moves along the rail 3 and is accompanied in its movement by the wiper blade 5 which maintains transparency of the window 1 against which it is applied.

In order that the movement of the wiper blade may be initiated, the forces which produce action on the gravity carriage 4 and which tend to cause this latter to move along the rail 3 must be higher than the forces which are necessary in order to induce the initial motion of the runner-wheels 6 and wiper blade 5 which is applied against the window, the force required to displace the wiper blade being the greater of the two.

It may prove necessary in order to facilitate the initial displacement of the wiper blade to adopt a mode of assembly whereby the gravity carriage 4 can be set in motion without initially displacing the wiper blade 5. The gravity carriage 4 can thus acquire a kinetic energy which is capable, in the majority of its movements, of initiating the motion of the wiper blade 5 at the moment when it is acted upon. A mode of assembly of this type can be carried into effect, for example, by providing a clearance 8 between the wiper-blade support 9 and the blade 5.

In a second example which is shown in FIG. 2, an arm 10 which is pivotally mounted at 11 is supported by a suction-cup 2 on the window 1, the effective transparency of which it is desired to maintain.

There are mounted on said arm 10 a gravity block 12 and a wiper blade 5 which is maintained applied against the window 1. A blade-spring 14 serves to balance the weight of the assembly which is pivotally mounted at 11 including the gravity block 12, in such a manner as to ensure that the position of equilibrium is practically indifferent over the entire upper area which is swept by the wiper blade 5. During the motion of the vehicle on which the window wiper herein described is fitted, the gravity block 12 which is subjected to a certain number of forces among those previously mentioned is accordingly caused to perform a pivotal movement about the pin 11 in conjunction with the arm 10 and is accompanied in this movement by the wiper blade 5, with the result that transparency of the glass panel or window 1 against which the blade is applied in thus maintained.

As in the first example, provision could again be made if necessary for a system of assembly in which any initial movement of the gravity block 12 is permitted to take place freely without immediately displacing the wiper blade 5. Accordingly, in the majority of movements performed by the block 12, the kinetic energy which is thus imparted thereto is capable of initiating the movement of the wiper blade 5 at the moment when it is acted upon. This mode of assembly can be carried into effect, for example, by providing a clearance 14 between the blade support 15 and the blade 5.

It is apparent that a large number of alternative forms can be devised without thereby departing either from the scope or the spirit of the invention.

What is claimed is:

1. A window wiper for a vehicle comprising a support device, means arranged to attach said support device to the vehicle, a bracket affixed to and arranged to move relative to said support device, a gravity block mounted on said bracket and arranged to be subjected to the forces produced by the motion of a vehicle, a support member secured to and movable with said bracket, a wiper blade attached to said support member whereby in reaction to the motion of the vehicle, said gravity block causes said bracket to move on said support device, and said wiper blade secured to said bracket by means of said support member moves with said bracket and is arranged to be disposed in wiping contact with a window on the vehicle.

2. A window wiper, as set forth in claim 1, wherein said wiper blade is secured to said support member to afford initial movement of said gravity block and bracket without movement of said wiper blade.

3. A window wiper, as set forth in claim 1, wherein said support device comprises a bar arranged to extend across and in spaced relationship with a window on the vehicle, and said means for attaching said bar to the vehicle comprising suction cups attached at spaced positions to said bar.

4. A window wiper, as set forth in claim 3, wherein said bracket comprises a carriage mounted on said support bar, and roller means mounted in said carriage and disposed in rolling contact on said support bar for movement along said support bar whereby said wiper blade is arranged to move back and forth with said carriage in a rectilinear direction for wiping the window.

5. A window wiper, as set forth in claim 1, wherein said support device comprises a rod member arranged to extend substantially perpendicularly to a window of the vehicle, and said means for attaching said support device comprises a suction cup mounted on the end of said rod.

6. A window wiper, as set forth in claim 5, wherein said bracket is pivotally mounted on said rod.

7. A window wiper, as set forth in claim 6, wherein a spring member is secured at one end to said rod and at its other end to said gravity block for balancing said gravity block support member and wiper blade on said rod.

8. A window wiper, as set forth in claim 7, wherein said bracket comprises a U-shaped member, said gravity block symmetrically mounted in said U-shaped member above said rod, whereby said U-shaped member is arranged to pivot about said rod in reaction to the movement of said gravity block caused by the motion of said vehicle and said wiper blade is arranged to move with said U-shaped member in a curvilinear direction for wiping a window.

References Cited

UNITED STATES PATENTS

| | | | |
|---|---|---|---|
| 1,028,843 | 6/1912 | Rhodes | 15—250.29 XR |
| 1,249,246 | 12/1917 | Thiebauth | 15—250.29 |
| 1,539,930 | 6/1925 | Berger | 15—250.3 |
| 2,206,006 | 6/1940 | Hendrey | 15—250.29 XR |
| 2,387,953 | 10/1945 | Terry | 15—250 XR |
| 2,580,577 | 1/1952 | Nally | 15—250.3 |
| 2,769,301 | 11/1956 | Liebman | 58—46 |

FOREIGN PATENTS

| | | |
|---|---|---|
| 512,661 | 5/1955 | Canada. |
| 920,429 | 3/1963 | Great Britain. |

WALTER A. SCHEEL, *Primary Examiner.*

ROBERT I. SMITH, *Assistant Examiner.*